United States Patent [19]

van der Meer et al.

[11] Patent Number: 5,104,939

[45] Date of Patent: Apr. 14, 1992

[54] POLYMER MIXTURE WHICH COMPRISES A POLYAMIDE, A POLYPHENYLENE ETHER AND AN AGENT TO IMPROVE THE IMPACT STRENGTH

[75] Inventors: Roelof van der Meer, Bergen op Zoom, Netherlands; Stanley Y. Hobbs, Schenectady, N.Y.

[73] Assignee: General Electric Company, Selkirk, N.Y.

[21] Appl. No.: 345,212

[22] Filed: Apr. 28, 1989

Related U.S. Application Data

[63] Continuation of Ser. No. 7,268, Jan. 26, 1987, abandoned, which is a continuation of Ser. No. 555,714, Nov. 28, 1983, abandoned.

[51] Int. Cl.$^5$ .................. C08L 47/00; C08L 53/02; C08L 71/12
[52] U.S. Cl. ...................... 525/92; 525/152; 525/905
[58] Field of Search .................... 525/92, 905, 152

[56] References Cited

U.S. PATENT DOCUMENTS

| | | |
|---|---|---|
| 3,379,792 | 4/1968 | Finholt . |
| 3,700,751 | 10/1972 | Mueller et al. . |
| 3,845,163 | 10/1974 | Murch . |
| 4,315,086 | 2/1982 | Ueno et al. . |
| 4,339,376 | 7/1982 | Kasahara et al. . |
| 4,421,892 | 12/1983 | Kasahara et al. . |
| 4,600,741 | 7/1986 | Aycock et al. . |

FOREIGN PATENT DOCUMENTS

| | | |
|---|---|---|
| 0024120 | 2/1981 | European Pat. Off. . |
| 0046040 | 2/1982 | European Pat. Off. . |
| 0131445 | 1/1985 | European Pat. Off. . |
| 0147874 | 7/1985 | European Pat. Off. . |
| 8505372 | 12/1985 | World Int. Prop. O. . |

*Primary Examiner*—Jacob Ziegler
*Attorney, Agent, or Firm*—Hedman, Gibson & Costigan

[57] ABSTRACT

The invention relates to polymer mixtures which comprise a polyphenylene ether, a polyamide and at least two agents to improve the impact strength. One of these agents is particularly suitable to improve the impact strength of polyphenylene ethers, and one is not particularly suitable to improve the impact strength of polyphenylene ethers.

22 Claims, No Drawings

POLYMER MIXTURE WHICH COMPRISES A POLYAMIDE, A POLYPHENYLENE ETHER AND AN AGENT TO IMPROVE THE IMPACT STRENGTH

This is a continuation of application Ser. No. 007,268 filed Jan. 26, 1987 which in turn is a continuation of application Ser. No. 555,714 filed Nov. 28, 1983, both now abandoned.

BACKGROUND OF THE INVENTION

The invention relates to a polymer mixture which comprises a polyamide, a polyphenylene ether, one or more agents to improve the compatibility of the polyamide and the polyphenylene ether, and an agent to improve the impact strength.

Polymer mixtures which comprise a polyamide, a polyphenylene ether, an agent to improve the compatibility of the polyamide and the polyphenylene ether and optionally an agent to improve the impact strength are known from EP-A 0024120; EP-A 0046040 and EP-A 0147874.

It is stated in EP-A 0024120 that it is desirable to incorporate in the polymer mixtures rubber-like polymers having a high molecular weight to improve the impact strength. By way of example are mentioned inter alia ethylene-propylene, ethylene-propylene-diene copolymers and partially hydrogenated styrene/butadiene block copolymers. There are no examples in which these rubber-like polymers are used. According to EP-A 0024120, a liquid diene compound or an epoxy compound or a compound having a two-fold or three-fold carbon-to carbon bond in the molecular structure and a carboxylic acid, acid anhydride, acid amide, imido, carboxylic acid ester, amino or hydroxyl group is used as an agent to improve the compatibility - in the meaning as will be defined hereinafter.

According to EP-A 0046040 the polymer mixtures described therein may comprise an agent improving the impact strength. In the Specification are mentioned by way of example a) graft polymers obtained by graft polymerization of a monomer which comprises as the main constituent a vinylaromatic compound on a rubber-like polymer and b) thermoplastic elastomers. One graft polymer which is mentioned by name is high-impact polystyrene. As thermoplastic elastomers are mentioned inter alia hydrogenated and non-hydrogenated styrene-butadiene block copolymers and styrene-ethylene-propylene polymers. It is stated that the graft polymer or the thermoplastic elastomer can be used individually or in combination. High-impact polystyrene having a high polybutadiene content and combinations of high-impact polystyrene and a hydrogenated styrene-butadiene block copolymer are used in the examples. One of these agents, notably the hydrogenated styrene-butadiene block copolymer, is generally considered as an agent which is particularly suitable to improve the impact strength of polyphenylene ether or of mixtures of polyphenylene ethers and high-impact polystyrene. The polymer mixtures according to EP-A 0046040 comprise a copolymer with units of a vinylaromatic compound and an alpha-beta dicarboxylic acid anhydride or an imide of an alpha-beta unsaturated dicarboxylic acid as an agent to improve the compatibility.

The polymer mixtures according to EP-A 0147874 may comprise one or more agents to improve the impact strength: mentioned by name as such are high-impact polystyrene, polybutadiene, ethylene-propylene-diene rubbers and hydrogenated or non-hydrogenated thermoplastic rubbers. This Patent Application does not give any examples in which agents improving the impact strength are used. According to this Application, a copolymer with 50-90 mol% units of a vinylaromatic compound and with 41-50 mol% units of an unsaturated dicarboxylic acid or a derivative thereof is used as an agent to improve the compatibility.

SUMMARY OF THE INVENTION

An impact strength which has been improved as compared with the just-mentioned known polymer mixtures can be obtained by means of the polymer mixtures according to the invention.

The invention is based on the recognition of the fact that two phases are present in the polymer mixtures which comprise a polyamide and a polyphenylene ether, and that an improved impact strength can be obtained by incorporating in both phases an agent to improve the impact strength and suitable for the phase in question.

The polymer mixtures according to the invention are characterized in that the polymer mixture comprises at least two different agents to improve the impact strength at least one of which is particularly suitable to improve the impact strength of polyphenylene ethers and at least one of which is not particularly suitable to improve the impact strength of polyphenylene ethers.

It is supposed that the first-mentioned agent to improve the impact strength improves the properties of the polyphenylene ether phase and the second mentioned agent improves those of the polyamide phase. As the second agent which likely improves the polyamide phase is to be considered any known agent to improve the impact strength of polyamides. These are generally rubber-like polymers which comprise a functional group which can react with polyamides. It has quite unexpectedly been found that rubber-like polymers which do not comprise a functional group may also be used in the polymer mixtures according to the invention as the second agent to improve the impact strength.

In the polymer mixtures according to the invention the first agent to improve the impact strength may consist of a mixture of agents which are particularly suitable to improve the impact strength of polyphenylene ethers. The second agent may also consist of a mixture of agents.

DETAILED DESCRIPTION OF THE INVENTION

A vinylaromatic polydiene di- or triblock copolymer, in which the block copolymer is not hydrogenated or is partially hydrogenated, or a polybutadiene may be used in the polymer mixtures according to the invention as an agent to improve the impact strength of polyphenylene ethers, i.e. as the first agent to improve the impact strength.

Agents not particularly suitable to improve the impact strength of polyphenylene ethers, i.e. the second agent to improve the impact strength, is to be understood to mean any product known in polymer chemistry as an agent to improve the impact strength of polymers with the exception of high-impact polystyrene, vinylaromatic polydiene di- or triblock copolymers, in which these may be non-hydrogenated or partially hydrogenated, and polybutadiene.

As the second agent to improve the impact strength may be used in the polymer mixtures according to the invention an ethylene-propylene copolymer or an ethylene-propylene-non-conjugated diene terpolymer on which a vinylmonomer with a carboxylic acid group or a derivative thereof has been grafted or on which a vinyl monomer with an epoxy group has been grafted.

The polymer mixtures according to the invention may comprise as the second agent to improve the impact strength an ethylene-propylene copolymer or an ethylene-propylene-non-conjugated diene terpolymer on which a vinylmonomer with a carboxylic acid group or a derivative thereof has been grafted or on which a vinyl monomer with an epoxy group has been grafted.

The polymer mixtures according to the invention may comprise as the second agent to improve the impact strength an alkylene-alkyl(meth)acrylate copolymer with an alkylene group having 2-6 carbon atoms and with an alkyl group having 1-8 carbon atoms.

The polymer mixtures according to the invention may comprise as the second agent to improve the impact strength an alkylene-alkyl(meth)acrylate with functional groups, which functional groups have been introduced either by a polymerization reaction while forming a terpolymer or by a grafting reaction, the functional group being selected from carboxylic acid, acid anhydride groups, acid amide groups, imido groups, carboxylic acid ester groups, amino groups or hydroxyl groups or epoxy groups, the alkylene group of the alkylene-alkyl(meth)acrylate comprising 2-6 carbon atoms and the alkyl group thereof comprising 1-8 carbon atoms.

The polymer mixtures according to the invention may comprise as the second agent to improve the impact strength a core-shell polymer having a rubber-like core and one or more shells (core-shell polymer).

The polymer mixtures according to the invention may comprise as the second agent to improve the impact strength a core-shell polymer the outermost core of which comprises one or more functional groups selected from carboxylic acid groups, acid anhydride groups, acid amide groups, imido groups, carboxylic acid ester groups, amino groups, epoxy groups or hydroxyl groups.

The polymer mixture according to the invention comprises the said constituents preferably in the following quantities, the percentages being calculated by weight with respect to the sum of the quantities by weight of polyamide(s), plus polyphenylene ether(s), plus impact strength improving agents: 5–93% of polyamide(s), 93–5% of polyphenylene ethers; 1–50% of agent to improve the impact strength of polyamides and 1–50% of agent to improve the impact strength of polyphenylene ethers.

The polymer mixtures according to the invention comprise one or more agents to improve the compatibility of the polyamide and the polyphenylene ether. These are to be understood to be agents which facilitate the mixing in the melt of two non-miscible polymers and also improve the bonding between the phases in such systems (see Chapter I of "Polymer-Polymer Miscibility", Academic Press, 1979). In practice this means that said agents suppress the tendency to delamination of two-phase polymer mixtures.

The polymer mixtures according to the invention comprise as the agent to improve the compatibility one or more compounds selected from the following groups:

A) liquid diene polymers or epoxy compounds or compounds having in their molecular structure a twofold or three-fold carbon-to-carbon bond and a carboxylic acid, acid anhydride, acid amide, imido, carboxylic acid ester, amino or hydroxyl group in a quantity of from 0.01 to 30 parts by weight per 100 parts by weight of polyamide plus polyphenylene ether, B) aliphatic polycarboxylic acids or derivatives thereof of the general formula: $(R_1O)_m R(COOR_2)_n (CONR_3R_4)_s$, wherein R is a saturated hydrocarbon group having 2 to 20 carbon atoms with a linear or branched chain; $R_1$ is a hydrogen atom or an alkyl group, aryl group, acyl group or carbonyldioxy group having 1 to 10 carbon atoms; each $R_2$ independently of each other is a hydrogen atom or an alkyl group or aryl group having 1 to 20 carbon atoms; each $R_3$ and $R_4$ independently of each other is a hydrogen atom or an alkyl group or aryl group having to 10 carbon atoms; m is equal to 1 and (n+s) is larger than or equal to 2 and n and s are each larger than or equal to zero; and wherein $(OR_1)$ is in an alpha position or beta position with respect to a carbonyl group and in which at least two carbonyl groups are separated by 2 to 6 carbon atoms, in a quantity of from 0.05 to 5 parts by weight per 100 parts by weight of polyamide plus polyphenylene ether.

C) a silane compound having in its molecular structure both (a) at least one silicon atom which is bonded to a carbon atom via an oxygen bridge and (b) at least an ethylenic carbon-to-carbon double bond or a carbon-to-carbon three-fold bond and/or a functional group selected from an amine group and a mercapto group, the functional group not being bonded directly to the silicon atom, in a quantity of from 0.05 to 4 parts by weight of polyamide plus polyphenylene ether, D) a functionalised polyphenylene ether consisting of the reaction product of (a) a polyphenylene ether and (b) a compound of the general formula (i)-Z-(ii), wherein (i) is at least a group of the formula [X—C(O)—] with X=F, Cl, Br, I, OH, —OR, or —O—C(O)—R with R=H, alkyl or aryl, wherein (ii) is at least a carboxylic acid, acid anhydride, acid amide, imido, carboxylic acid ester, amino or hydroxyl group, and in which the groups (i) and (ii) are covalently bonded together via a bridge Z, Z being a bivalent hydrocarbon radical, E) an oxidized polyolefin wax, optionally in combination with an organic phosphite, in a quantity of from 0.01 to 10 parts by weight per 100 parts by weight of polyamide plus polyphenylene ether, F) a copolymer with units of a vinylaromatic compound and of an alpha-beta unsaturated dicarboxylic acid or dicarboxylic acid anhydride or a copolymer with units of a vinylaromatic compound and of an imide compound of an alpha-beta unsaturated dicarboxylic acid, in a quantity of from 0.5 to 100 parts by weight per 100 parts by weight of polyamide plus polyphenylene ether, G) the reaction product of a) a 1,2-substituted olefinic compound with carboxyl group or acid anhydride group, b) a polyphenylene ether and c) a radical initiator, in a quantity of from 0.5 to 150 parts by weight per 100 parts by weight of polyamide plus polyphenylene ether.

The agents for improving the compatibility mentioned sub D) and G) can replace the polyphenylene ether in the polymer mixtures according to the invention entirely or partly.

The agents mentioned above sub A) to G) for improving the compatibility are known partly from the European Patent Applications mentioned hereinbefore and are described partly in Patent Applications of the Applicants not yet published.

Upon preparing the polymer mixtures according to the invention it has been found that the way of preparing and notably the sequence in which the various constituents are mixed together often is of great importance to obtain optimum properties. The correct sequence depends on the specifically used constituents.

It is generally preferred to use a method in which the polyphenylene ether is mixed first with the agent to improve the compatibility before the polyphenylene ether is mixed with the remaining constituents. However, this does not hold good in all cases.

Good results are also obtained by premixing the polyamide with the agent which is not particularly suitable to improve the impact strength of polyphenylene ether.

Mixing the individual constituents is preferably carried out by mixing in the melt, for example, in an extruder.

The polymer mixtures according to the invention comprise at least one or more compounds selected from each of the groups of compounds mentioned hereinafter:
polyphenylene ether
polyamide
agent to improve the compatibility
agent to improve the impact strength of polyphenylene ethers, also referred to as the first agent
agent not particularly suitable to improve the impact strength of polyphenylene ether, also referred to as the second agent.

Polyphenylene ethers

Polyphenylene ethers are compounds which are known per se. For this purpose reference may be made to the U.S. Pat. No. 3,306,874; 3,306,875; 3,257,357 and 3,257,358. Polyphenylene ethers are usually prepared by an oxidative coupling reaction—in the presence of a copper amine complex—of one or more two-fold or three-fold substituted phenols; homopolymers and copolymers, respectively, being obtained. Copper amine complexes derived from primary, secondary and/or tertiary amines may be used. Examples of suitable polyphenylene ethers are:
poly(2,3-dimethyl-6-ethylphenylene-1,4-ether)
poly(2,3,6-trimethylphenylene-1,4-ether)
poly [2-(4'-methylphenyl)phenylene-1,4-ether]
poly(2-bromo-6-phenylphenylene-1,4-ether)
poly(2-methyl-6-phenylphenylene-1,4-ether)
poly(2-phenylphenylene-1,4-ether)
poly(2-chlorophenylene-1,4-ether)
poly(2-methylphenylene-1,4-ether)
poly(2-chloro-6-ethylphenylene-1,4-ether)
poly(2-chloro-6-bromophenylene-1,4-ether)
poly(2,6-di-n-propylphenylene-1,4-ether)
poly(2-methyl-6-isopropylphenylene-1,4-ether)
poly(2-chloro-6-methylphenylene-1,4-ether)
poly(2-methyl-6-ethylphenylene-1,4-ether)
poly(2,6-dibromophenylene-1,4-ether)
poly(2,6-dichlorophenylene-1,4-ether)
poly(2,6-diethylphenylene-1,4-ether)
poly(2,6-dimethylphenylene-1,4-ether)

Copolymers, for example, copolymers derived from two or more phenols as used in the preparation of the above-mentioned homopolymers are also suitable. Furthermore suitable are graft copolymers and block copolymers of vinylaromatic compounds, for example, polystyrene, and of polyphenylene ether as described hereinbefore.

When an agent to improve the compatibility as indicated hereinbefore sub D) or G) is used, the polyphenylene ether may be replaced entirely or partly by said agent.

Polyamides

Polyamides are used in the polymer mixtures according to the invention. In the method according to the invention polyamides are used as the constituent B. All thermoplastic polyamides known per se may be used in the polymer mixtures according to the invention. Suitable polyamides are, for example, polyamide-4; polyamide-6; polyamide-4,6; polyamide-6,6; polyamide-3,4; polyamide-12; polyamide-11; polyamide-6,10; polyamides prepared from terephthalic acid and 4,4'-diaminocyclohexyl methane, polyamides prepared from azelaic acid, adipic acid and 2,2-bis-(p-aminocyclohexyl)propane, polyamides prepared from adipic acid and metaxylylene diamine, polyamides from terephthalic acid and trimethyl hexamethylene diamine.

Agent to Improve the Compatability.

The polymer mixtures according to the invention must comprise one or more constituents to improve the compatibility. The use of an agent to improve the compatibility in polymer mixtures which comprise a polyphenylene ether and a polyamide is known per se in itself. The polymer mixtures according to the invention comprise one or more of the above-mentioned agents to improve the compatibility.

The agents mentioned above sub (A) to improve the compatibility are known from EP-A-0 024 120. All the agents mentioned therein are suitable for the polymer mixtures according to the invention. Notably, maleic acid anhydride, maleic acid, fumaric acid, maleimides, maleic acid amides and further reaction products of the compounds just mentioned with a (di)amine, are particularly suitable. All the compounds mentioned in EP-A-0 024 120 on page 6, line 1 to page 12, line 27 are considered to be incorporated herein by reference.

The agents mentioned above sub (B) to improve the compatibility are disclosed in a non-pre-published Patent Application Ser. No. 06/736,489 filing date May 20, 1985 by the Applicants. The agents described therein can be sub-divided into three classes: polycarboxylic acids, esters and amides thereof. Examples of suitable polycarboxylic acids are citric acid, malic acid, and the derived forms thereof, for example, the hydrates and anhydrides. Examples of suitable esters are acetylcitrate and mono- and/or distearyl citrates. Examples of suitable diamines are: N,N'-diethyl citric acid amide; N,N'-dipropyl citrit acid amide; N-phenyl citric acid amide; N-dodecyl citric acid amide; N,N'-didodecyl citric acid amide and N-dodecyl malic acid amide. Derivatives of the above-mentioned compounds may also be used, in particular the salts of these compounds. Suitable salts are those derived from amines and alkali metal salts and alkaline earth metal salts. Examples thereof are calcium maleate, calcium potassium maleate and potassium citrate.

The agents mentioned above sub (C) to improve the compatibility are disclosed in Applicants' non-prepublished Patent Application 06/699,130, now U.S. Pat. No. 5,061,746. The silane derivatives mentioned therein have at least one silicon atom which is bonded to a carbon atom via an oxygen bridge. For that purpose, at least an alkoxy group or an acetoxy group will usually be present in the silane. Moreover, silicon atoms which are bonded together via an oxygen bridge, i.e. siloxane groups, may be present in the silane derivative. In addition, the silane derivatives must have at least one of the following characteristic features, namely the presence in the molecule of one or more carbon-to-carbon double bonds or triple bonds, an amino group and/or a mercapto group. The carbon-to-carbon double or triple bond may be coupled directly to the silicon atom. The mercapto group or the amino group may not be coupled directly to a silicon atom. Examples of suitable silane derivatives are: gamma aminopropyl triethoxy silane; vinyl-tris-(2-methoxy-ethoxy)silane; 5-(bicycloheptenyl)triethoxy silane and gamma mercaptopropyl trimethoxy silane.

The agents mentioned above sub D) for improving the compatibility are disclosed in Applicants' non-pre-published Patent Application Ser. No. 06/654,922 filing date Sept. 27, 1984. The compounds mentioned therein can be obtained by reacting a polyphenylene ether with, for example, chloroethyanoyl succinic anhydride; trimellitic anhydride acid chloride; chloroformyl succinic anhydride; 1-acetoxyacetyl-3,4-dibenzoic acid anhydride, the acid chloride of terephthalic acid. The compounds formed can be purified by precipitation in methanol or acetone. These agents may be used in combination with primary or secondary amines, for example, butyl amine, dibutyl amine, n.octadecyl amine.

The use of the compound mentioned above sub (E) to improve the compatibility is described in a non-pre-published Patent Application Ser. No. 06/739,401 filing date Mar. 30, 1985 by Applicants. Oxidized polyolefin waxes are compounds known per se. For this purpose reference may be made, for example, to DE-A 20 35 706; DE-A 30 47 915 and DE-A 22 01 862. These types of wax are usually prepared by oxidation in air or in suspension of a polyolefin wax.

The compounds mentioned above sub (F) are disclosed in EP-A 0 046 040 and EP-A 0 147 874. Examples of these compounds are styrene maleic acid anhydride copolymers, styrene-maleic acid anhydride methacrylate terpolymers, styrene-maleic acid anhydride acrylate terpolymers, and the rubber-modified variants of these compounds.

The compounds mentioned above sub (G) and their mode of preparation are disclosed in Japanese Patent Applications 59/059,724; 59/086,653 and 59/066,452. It relates to the reaction product of a) a 1,2-substituted olefinic compound with carboxyl group or acid anhydride group (for example, maleic acid anhydride), b) a polyphenylene ether and c) a radical initiator (for example, benzoyl peroxide).

Agent to Improve the Impact Strength of Polyphenylene Ethers

Agents to improve the impact strength of polyphenylene ethers are known per se. All agents known per se may be used in the polymer mixtures according to the invention. For this purpose reference may be made, for example, to U.S. Pat. Nos. 4,113,800; 4,383,082; 3,994,856; 4,113,797; 4,191,685; 4,373,055; 4,234,701; 3,833,688; 4,478,979, which Patent Specifications may be considered to be incorporated herein by reference. More in particular may be mentioned by name vinylaromatic-polydiene di- or triblock copolymers, in which the block copolymer is not hydrogenated or is partly hydrogenated. Partially hydrogenated or non-hydrogenated linear styrene–butadiene-styrene triblock copolymers and radial styrene-butadiene block copolymers whether or not partially hydrogenated may be mentioned by name. Some types of polybutadiene and notably those types which are commercially available as a crumbly product, are also suitable.

Agent which is not Particularly Suitable to Improve the Impact Strength of Polyphenylene Ethers Agents to improve the impact strength of polyamides are known per se. For this purpose reference may be made to the literature. In principle, any known agent to improve the impact strength of polyamides is suitable. In particular an agent may be selected from one or more of the following groups of compounds:

Ethylene-propylene copolymers or ethylene-propylene-non-conjugated diene terpolymers and all the remaining known compounds of this type, for example, as described in U.S. Pat. Nos. 2,933,480; 3,000,866; 3,093,621; 3,379,701 and 3,407,158. These copolymers and terpolymers are usually referred to as EPM and EPDM.

Ethylene-propylene copolymers or ethylene-propylene non-conjugated diene terpolymers on which a functional group has been grafted. Examples of functional groups are carboxylic acid groups or derivatives thereof. This type of agent to improve the impact is strength disclosed in U.S. Pat. Nos. 3,884,882; 4,174,358; 4,251,644; 4,346,194 and 4,448,934. It is also possible to use epoxy groups as functional groups, for example, by grafting the copolymer or terpolymer with glycidyl methacrylate.

Alkylene-alkyl(meth)acrylate copolymers with an alkylene group having 2-6 carbon atoms and with an alkyl group having 1-8 carbon atoms. These compounds are disclosed, for example, in U.S. Pat. Nos. 3,700,751 and 3,845,163. This type of polymer is prepared by copolymerizing an olefin, for example, ethylene, propylene, with one or more of the following monomers: a $C_1$–$C_8$ alkyl acrylate, for example, methyl acrylate, ethyl acrylate, hexyl acrylate and the like; a $C_1$–$C_8$ alkyl methacrylate, for example, methyl methacrylate, ethyl methacrylate, hexyl methacrylate and the like; acrylic acid or methacrylic acid. To be preferred are the known copolymers of ethylene with an alkyl ester of acrylic acid. In general, the acrylate content or methacrylate content of the copolymer may be from approximately 10 to approximately 30% by weight. The olefin content of the copolymer may be from approximately 70 to approximately 90% by weight. An example of the last-mentioned copolymers is an ethylene-ethyl acrylate copolymer with a weight ratio of ethylene to ethyl acrylate of approximately 4.5 to 1.

Alkylene-alkyl(meth) acrylate polymers with a functional group, which functional group has been introduced, for example, by a polymerisation reaction while forming a terpolymer or by a grafting reaction. The functional group has been selected from carboxylic acid groups, acid anhydride groups, acid amide groups, imido groups, carboxylic acid ester groups, amino groups, hydroxyl groups or epoxy groups. The alkylene group of the alkylene alkyl(meth)acrylate comprises 2–6 carbon atoms and the alkyl group thereof comprises 1–8 carbon atoms. This type of agents to improve the impact strength is described, for example, in U.S. Pat. Nos. 4,436,872; 4,478,978. Particularly suitable are ethylene-ethyl acrylate-maleic acid polymers and ethylene-ethylacrylate-fumaric acid polymers. This type of polymers can also be obtained by complete or partial saponification of the above-mentioned non-functionalized alkylene alkyl(meth)-acrylate copolymers. For this purpose reference may be made to U.S. Pat. Nos. 4,485,214.

Core-shell polymers having a rubber-like core and one or more shells. For this purpose, reference may be made, for example, to U.S. Pat. Nos. 3,808,180; 4,096,202; 4,180,494; 4,306,040; 4,375,532 and 4,495,324. Core-shell polymers generally comprise a rubber-like core, for example, mainly constructed from a diene rubber, for example, polybutadiene rubber, or mainly from an acrylate rubber, for example, butylacrylate. The rubber of the core may moreover comprise one or more comonomers. The core may be cross-linked by carrying out the preparation of the core in the presence of cross-linking agents. As cross-linking agents may be used bifunctional compounds. One or more shells have been provided on the core, of which generally at least one is constructed from a stiff, i.e. non-rubber-like, polymer or copolymer. The shell or shells is or are generally built up from one or more of the following monomers: alkylmethacrylates, alkylacrylates, acrylonitrile, vinylaromatic compounds, for example, styrene or substituted styrene compounds, for example, alpha-methylstyrene or halogenated styrene compounds. The shell may be "bonded" to the shell via graft linking agents which may be present in the core. The preparation of core-shell polymers is generally known; for this purpose, reference may be made, for example, to the U.S. Patent Specifications mentioned hereinbefore.

Core-shell polymers having a rubber-like core and one or more shells (core-shell polymer), the outermost shell of which comprises one or more functional groups selected from carboxylic acid groups, acid anhydride groups, acid amide groups, imido groups, carboxylic acid ester groups, amino groups, epoxy groups or hydroxyl groups. Such core-shell polymers are described, for example, in U.S. Pat. Nos. 3,668,274; 4,034,013; 4,474,927. This type of core-shell polymers is generally prepared by incorporating in the (outermost) shell—by a polymerisation reaction—a monomer which comprises a double or threefold unsaturated bond and one or more of the above-mentioned functional groups. Examples of these core-shell polymers are polymers having a core of butylacrylate rubber and a shell of styrene or styrene acrylonitrile with 0.1–10% by weight of maleic acid anhydride.

Of course it is possible to use a combination of one or more of the above-mentioned agents to improve the impact strength.

The polymer mixtures according to the invention comprise the indicated constituents preferably in the following quantities, the said percentages being calculated by weight with respect to the sum of the quantities by weight of polyamide(s), polyphenylene ether(s) and impact-strength-improving agents: 5–93% of polyamide(s); 93–5% of polyphenylene ethers; 1–50% of agent to improve the impact strength of polyphenylene ethers and 1–50% of agent not particularly suitable to improve the impact strength of polyphenylene ethers. The non-functionalized alkylene-alkyl(meth)acrylate polymers are preferably used in a quantity of less than 12.5%.

In addition to the above-mentioned constituents, the polymer mixtures according to the invention may comprise one or more of the following constituents: styrene homo- or copolymers, high-impact polystyrene, dyes, pigments, reinforcing fillers, fillers, stabilizers and flame retarding agents. As stabilizers may be used the agents known generally for polyamides.

The polymer mixtures according to the invention may be prepared in various manners: by mixing solutions or slurries of the constituents, succeeded by evaporating or also by melt extrusion. Melt extrusion is generally preferred. In melt extrusion, the individual constituents are introduced, for example, into an extruder. In the extruder the constituents are heated, usually to a temperature above the melting temperature of the constituent(s) having the highest or one of the highest melting-point(s), for example, the polyphenylene ether, and intimately mixed. The extruder then produces the so-called extrudate, usually in the form of a strand, which is chopped up. The resulting pieces of the polymer mixtures according to the invention may further be processed according to techniques known per se for injection moulding of thermoplastic synthetic resins.

In preparing the polymer mixtures according to the invention in an extruder it has been found that the sequence in which the various constituents are mixed is of importance. For example, polymer mixtures having better properties are often obtained when the polyphenylene ether or a part of the quantity of polyphenylene ether to be used is pre-mixed in an extruder in a separate step with the agent to improve the compatibility. The resulting pre-extrudate is then mixed with the remaining constituents in an extruder.

It is also possible first to prepare a pre-mixture of the polyamide or a part of the quantity of polyamide to be used and the agent not particularly suitable to improve the impact strength of polyphenylene ethers. The resulting pre-mixture is then mixed with the remaining constituents.

In some cases, polymer mixtures having better properties were obtained when first the polyamide or a part of the quantity of polyamide to be used, is mixed in the melt with the agent not particularly suitable to improve the impact strength of polyphenylene ethers, the polyphenylene ether or a part of the quantity of polyphenylene ether to be used is then mixed with the agent to improve the the the impact strength of polyphenylene ethers and with the agent to improve the compatibility in the melt, after which the two resulting pre-mixtures and the constituents possibly not yet incorporated in the pre-mixtures are mixed in the melt.

The invention also relates to products obtained from the polymer mixtures according to the invention.

The invention will now be described with reference to the ensuing specific examples.

DESCRIPTION OF THE PREFERRED EMBODIMENTS

Example I and Comparative Example A

A polymer mixture was prepared from 49 parts by weight of a polyphenylene ether (poly(2,6-dimethylphenylene-1,4-ether) with an intrinsic viscosity of approximately 49 ml/g measured at 25° C. in chloroform, 41 parts by weight of a polyamide-6,6 having a nummer-averaged molecular weight $\overline{Mn}$ of 20,000 and a viscosity index of 135 ml/g, measured according to ISO R 307 (0.5 g of polyamide dissolved in 100 g of 90% formic acid at 25° C.), and a moisture content after drying of less than 0.2% by weight, 10 parts by weight of a non-hydrogenated styrene-butadiene-styrene block copolymer, 0.7 parts by weight of citric acid-1-hydrate and 0.4 parts by weight of stabilizers (comparative example A).

Moreover a mixture was prepared starting from the constituents mentioned hereinbefore while using the same quantities, in which in addition 2 parts by weight of an ethylene-ethylacrylate copolymer with 18% ethyl-acrylate was used (Example I according to the invention).

The two above-mentioned polymer mixtures were thoroughly mixed and extruded in a Werner-Pfleiderer extruder at an average temperature of 285° C. and at 300 rpm. All the constituents, except 31 parts by weight of the polyamide-6,6, were collectively supplied to the end of the extruder; the said 31 parts by weight of polyamide-6,6 were supplied via a special filling opening approximately halfway the extruder. The resulting extrudate was chopped up.

Test rods were manufactured from the resulting polymer mixtures by injection moulding according to ASTM D 638 for the determination of the tensile stress upon fracture and the elongation upon fracture. Test rods according to ASTM D 256 were also moulded for the measurement of the impact strength according to Izod (with notch). Moreover, a falling dart impact was measured at disks having a thickness of 3.2 mm and a diameter of 100 m. In this test a standardized test body having a hemispherical tip and a weight of 100 N is dropped on the disk from a height of 2.2 m, the disk being laid on an annular support having a diameter of 95 mm. The absorbed energy to fracture was measured. The energy value thus found is indicated as "falling dart impact" (DIN 53443).

The values found, as well as the composition of the polymer mixtures according to the Examples I and A, are recorded in Table 1 below.

It may be seen from the results of Table 1 that the addition of a comparatively small quantity of ethylene-ethyl-acrylate leads to a great improvement of the Izod impact strength.

TABLE 1

| Composition | Example | |
|---|---|---|
| (parts by weight) | A | I |
| Polyamide-6,6 | 41 | 41 |
| Polyphenylene ether | 49 | 49 |
| Styrene-butadiene-styrene block copolymer | 10 | 10 |
| Ethylene-ethylacrylate copolymer | — | 2 |
| Citric acid-1-hydrate | 0.7 | 0.7 |
| Stabilizers | 0.4 | 0.4 |
| Properties | | |
| Tensile stress upon flow (MPa) | 66.8 | 57.6 |
| Elongation upon fracture (%) | 56 | 48 |
| Izod impact strength (J/m) | 248 | 325 |
| Falling dart impact (J) | 205 | 220 |

EXAMPLES II to V and Comparative Examples B, C, D, E and F

Various core-shell polymers were prepared by polymerization of butylacrylate (PBA) for the core and of methyl methacrylate (PMMA) or methyl methacrylate/styrene mixtures, with in a few cases maleic acid anhydride (MAA) for the shell. These core-shell polymers (Nos 1–4) were prepared as follows:

The preparation of PBA core 1.1 The following solutions were prepared:
- A. 501.8 parts by weight of n-butylacrylate
  2.6 parts by weight of allylmethacrylate
  7.7 parts by weight of tris(2-acryloxy-ethyl) isocyanurate
- B. 12.8 parts by weight of sodium (n-dodecyl benzene sulphonate)
  512 parts by weight of demineralized water
- C. 2.56 parts by weight of $K_2S_2O_8$ (potassium peroxydisulphate)
  128 parts by weight of demineralized water
- D. 2.56 parts by weight of $Na_2S_2O_5$ (sodium disulphite)
  128 parts by weight of demineralized water.

A glass 2-liter-reactor was filled with B and a quarter of solution A, cooled to 10° C. and made oxygen-free by rinsing/evacuating with nitrogen five times. The mixture of A and B was emulsified by stirring. The temperature was then raised to 40° C. 60 Parts by weight of (deaerated) solution C were injected, succeeded by 60 parts by weight of (deaerated) solution D. The polymerisation reaction set in immediately, which resulted in a rise in temperature to 70°–75° C. in 10 minutes. The temperature was then adjusted at 60° C. and the pressure at 1.5 atmospheres. The remainders of solutions C and D (deaerated) were gradually added in a period of 2 hours by means of dosing pumps. Stirring was then continued for another hour at 60° C. to complete the reaction.

Preparation of the core-shell polymer 1.2 The following solutions were prepared and deaerated:
- E. 125.4-a parts by weight of methylmethacrylate
  a parts by weight of styrene
  0.64 parts by weight of allylmethacrylate
  2.56 parts by weight of maleic acid anhydride
  1.9 parts by weight of tris(2-acryloxy-ethyl) isocyanurate
- F. 0.64 parts by weight of $K_2S_2O_8$ (potassium peroxydisulphate)
  160 parts by weight of demineralized water
- G. 0.64 parts by weight of $Na_2S_2O_5$ (sodium disulphite)
  32 parts by weight of demineralized water The solutions E, F and G were added gradually to the reaction mixture obtained sub 1.1 over a period of thirty minutes, while stirring.

Isolation 1.3 The resulting latex was destabilized by pouring the contents of the reactor through a filter into a rapidly stirred aqueous solution with 1% by weight of $CaCl_2$. The precipitated polymer was isolated by filtration, washed with water and dried in a vacuum at 60° C.

The following core-shell polymers were prepared (variable a = content of styrene)

TABLE 2

| a parts by weight | swelling index (g/g) | gel fraction (wt. %) | core-shell polymer No. |
|---|---|---|---|
| 0 | 4.9 | 99.0 | 1* |
| 0 | 4.6 | 99.0 | 2 |
| 62.7 | 6.0 | 87.3 | 3 |
| 118.0 | 5.6 | 95.4 | 4 |

*comprises no maleic acid anhydride.

The above-mentioned core-shell polymers were premixed in an extruder with the same polyamide-6,6 and the same stabilizers as used in Example I. The extruder was adjusted at a temperature of on an average 275° C. and a speed of 300 rpm. In this manner, five different pre-mixtures were prepared having a composition as indicated in Table 3.

TABLE 3

| Composition | Pre-mixtures No. | | | | |
|---|---|---|---|---|---|
| (parts by weight) | P0 | P1 | P2 | P3 | P4 |
| Polyamide-6,6 | 100 | 80 | 80 | 80 | 80 |
| Core-shell polymer No. | | | | | |
| 1 | — | 20 | — | — | — |
| 2 | — | — | 20 | — | — |
| 3 | — | — | — | 20 | — |
| 4 | — | — | — | — | 20 |
| Stabilizers | 0.4 | 0.4 | 0.4 | 0.4 | 0.4 |

Various polymer mixtures B to F and II to IV were prepared while using the pre-mixtures P0, P1, P2, P3, P4, polyphenylene ether thus obtained (as used in Example I), a partially hydrogenated styrene-butadiene-styrene triblock copolymer, maleic acid anhydride, polyamide-6,6 (as used in Example I) and stabilizers (as used in Example I). All polymer mixtures were extruded in a Werner-Pfleiderer extruder adjusted at an average temperature of approximately 285° C., speed 300 rpm. The constituents were fed into the extruder in two different places; one part of the constituents at the end of the extruder and one part via a special filling machine approximately halfway the extruder. All this is recorded in Table 4 hereinafter. Furthermore, the properties of the resulting polymer mixtures are recorded in Table 4.

Examples VI to XVI, comparative examples G and H.

In these examples various agents not particularly suitable to improve the impact strength of polyphenylene ether were used. It concerns the following agents:

| Second agent to improve the impact strength No. | Chemical nature |
|---|---|
| 5 | Terpolymer of ethylene (66%)-butyl acrylate maleic acid anhydride; |
| 6* | PBA core (72.5%); shell (27.5%): PS-MZA copolymer with 3.5% MZA calculated with respect to PS + MZA; |
| 7* | PBA core (72.5%7); shell (27.5%): PS-AN-MAA with 6.0% MAA calculated with respect to PS + AN + MAA; |
| 8* | PBA core (72.5%); shell (27.5%): PS-AN-MAA with 3.5% MAA calculated with respect to PS + AN + MAA; |
| 9 | ethylene-ethylacrylate (18% ethylacrylate); |
| 10 | polybutadiene core (67.5%); PMMA-PS shell (32.5%); |
| 11 | EPDM with 1.5% MAA |
| 12 | EPDM with 0.6% MAA; |

PBA = polybutylacrylate;
PS = polystyrene;
MAA = maleic acid anhydride;
AN = acrylonitrile;
PMMA = polymethylmethacrylate;
EPDM = ethylene-propylene-nonconjugated diene monomer polymer.
*prepared as indicated in Examples II to V while using the constituents mentioned.

The agents (Nos 5 to 12) mentioned above were premixed in an extruder (extrusion temperature on an average 275° C) with the same type of polyamide-6,6 and with the same stabilizers as used in Example I. In this manner the pre-mixtures P5 to P14 were obtained. The composition of these pre-mixtures was as follows:

TABLE 4

| | Example no. | | | | | | | | |
|---|---|---|---|---|---|---|---|---|---|
| | B | C | D | E | II | III | IV | V | F |
| Composition (parts by weight) | | | | | | | | | |
| Supplied via end of extruder | | | | | | | | | |
| polyphenylene ether | 50 | 50 | 50 | 50 | 45 | 45 | 45 | 45 | 45 |
| partially hydrogenated triblock copolymer | — | — | — | — | 5 | 5 | 5 | 5 | 5 |
| maleic acid anhydride | 0.25 | 0.25 | 0.25 | 0.25 | 0.25 | 0.25 | 0.25 | 0.25 | 0.25 |
| polyamide-6,6 | — | — | — | — | 10 | 10 | 10 | 10 | 10 |
| stabilisers | 0.4 | 0.4 | 0.4 | 0.4 | 0.4 | 0.4 | 0.4 | 0.4 | 0.4 |
| pre-mixture P1 | 10 | — | — | — | — | — | — | — | — |
| pre-mixture P2 | — | 10 | — | — | — | — | — | — | — |
| pre-mixture P3 | — | — | 10 | — | — | — | — | — | — |
| pre-mixture P4 | — | — | — | 10 | — | — | — | — | — |
| Supplied via special filling aperture halfway extruder | | | | | | | | | |
| pre-mixture P0 | — | — | — | — | — | — | — | — | 25 |
| pre-mixture P1 | 40 | — | — | — | 25 | — | — | — | — |
| pre-mixture P2 | — | 40 | — | — | — | 25 | — | — | — |
| pre-mixture P3 | — | — | 40 | — | — | — | 25 | — | — |
| pre-mixture P4 | — | — | — | 40 | — | — | — | 25 | — |
| polyamide-6,6 | — | — | — | — | 15 | 15 | 15 | 15 | 15 |
| Properties | | | | | | | | | |
| Tensile strength upon flow (MPa) | 62 | 62 | 60 | 59 | 55 | 55 | 55 | 55 | 66 |
| Elongation at fracture (%) | 21 | 18 | 14 | 33 | 56 | 75 | 63 | 75 | 64 |
| Izod impact strength (J/m) | 109 | 103 | 80 | 177 | 232 | 226 | 233 | 265 | 154 |
| Falling dart impact (J) | 12 | 11 | 2 | 16 | 141 | 191 | 168 | 158 | 134 |

As may be seen in Table 4, the polymer mixtures according to the invention have a better Izod impact strength and a better falling dart impact value than the comparative examples B to F.

| Pre-Mixture | Composition (parts by weight) | | Polyamide-6,6 Quantity | Stabilizers Quantity |
|---|---|---|---|---|
| | Second agent to improve the impact strength | | | |
| | Type | Quantity | | |
| P5 | No. 5 | 10 | 90 | 0.4 |
| P6 | No. 6 | 10 | 90 | 0.4 |
| P7 | No. 7 | 10 | 90 | 0.4 |
| P8 | No. 8 | 10 | 90 | 0.4 |
| P9 | No. 9 | 10 | 90 | 0.4 |
| P10 | No. 10 | 10 | 90 | 0.4 |
| P11 | No. 11 | 10 | 90 | 0.4 |
| P12 | No. 12 | 10 | 90 | 0.4 |
| P13 | No. 9 | 25 | 75 | 0.4 |
| P14 | No. 10 | 25 | 75 | 0.4 |

A pre-mixture P15 was prepared from 90 parts by weight of polyphenylene ether, 10 parts by weight of a partially hydrogenated styrene-butadiene-styrene block copolymer and 0.50 parts by weight of maleic acid anhydride. The said constituents were for that purpose mixed in an extruder at an average temperature of 305° C., speed 300 rpm.

In the Examples YI to XYI, always 50.25 parts by weight of pre-mixture P15, 50.2 parts by weight of one of the pre-mixtures P5 to P14, and 0.4 parts by weight of stabilizers were mixed and extruded in an extruder (average adjusted temperature 285° C.), several polymer mixtures according to the invention being obtained.

The composition of the resulting final products and the properties thereof are summarized in Tables 5 and 6.

TABLE 5

| | Example No. | | | | | | |
|---|---|---|---|---|---|---|---|
| | G | VI | VII | VIII | IX | X | XI |
| Composition (parts by weight) | | | | | | | |
| polyamide-6,6 | 50 | 45 | 45 | 45 | 45 | 45 | 45 |
| second agent to improve the impact strength no. 5 | — | 5 | — | — | — | — | — |
| second agent to improve the impact strength no. 6 | — | — | 5 | — | — | — | — |
| second agent to improve the impact strength no. 7 | — | — | — | 5 | — | — | — |
| second agent to improve the impact strength no. 8 | — | — | — | — | 5 | — | — |
| second agent to improve the impact strength no. 9 | — | — | — | — | — | 5 | — |
| second agent to improve the impact strength no. 10 | — | — | — | — | — | — | 5 |
| polyphenylene ether | 45 | 45 | 45 | 45 | 45 | 45 | 45 |
| partially hydrogenated styrene-butadiene-styrene triblock copolymer | 5 | 5 | 5 | 5 | 5 | 5 | 5 |
| maleic acid anhydride | 0.25 | 0.25 | 0.25 | 0.25 | 0.25 | 0.25 | 0.25 |
| stabilisers | 0.6 | 0.6 | 0.6 | 0.6 | 0.6 | 0.6 | 0.6 |
| Properties | | | | | | | |
| Tensile strength upon flow (MPa) | 63 | 53.7 | 54.1 | 54.0 | 57.0 | 51.5 | 55.1 |
| Elongation at fracture (%) | 38 | 53 | 53 | 60 | 61 | 59 | 51 |
| Izod impact strength (J/m) | 143 | 523 | 235 | 237 | 240 | 415 | 235 |
| Falling dart impact (J) | 138 | 210 | 212 | 206 | 203 | 184 | 220 |

TABLE 6

| | Example No. | | | | | | |
|---|---|---|---|---|---|---|---|
| | G | XII | XIII | H | XIV | XV | XVI |
| Composition (parts by weight) | | | | | | | |
| polyamide-6,6 | 45 | 45 | 45 | 45 | 37.5 | 37.5 | 37.5 |
| second agent to improve the impact strength no. 11 | — | 5 | — | — | — | — | 12.5 |
| second agent to improve the impact strength no. 12 | — | — | 5 | — | — | — | — |
| second agent to improve the impact strength no. 9 | — | — | — | — | 12.5 | — | — |
| second agent to improve the impact strength no. 10 | — | — | — | — | — | 12.5 | — |
| polyphenylene ether | 45 | 45 | 45 | 45 | 45 | 45 | 45 |
| partially hydrogenated styrene-butadiene-styrene triblock copolymer | 5 | 5 | 5 | 10 | 5 | 5 | 5 |
| maleic acid anhydride | 0.25 | 0.25 | 0.25 | 0.25 | 0.25 | 0.25 | 0.25 |
| stabilisers | 0.6 | 0.6 | 0.6 | 0.6 | 0.6 | 0.6 | 0.6 |
| Properties | | | | | | | |
| Tensile strength upon flow (MPa) | 63 | 55.4 | 54.0 | 59.8 | 43.9 | 50.6 | 47.6 |
| Elongation at fracture (%) | 38 | 47 | 43 | 48 | 56 | 102 | 99 |
| Izod impact strength (J/m) | 143 | 605 | 618 | 234 | 150 | 258 | 760 |
| Falling dart impact (J) | 138 | 168 | 201 | 209 | 79 | 200 | 181 |

It may be seen from Tables 5 and 6 that the examples according to the invention have a better impact strength than the comparative examples G and H which comprise only one agent to improve impact strength.

From a comparison of Example X with Example XIV it appears that in polymer mixtures according to the invention a content of non-functionalized ethylene-ethylene acrylate copolymer (second agent No. 9) of 12.5% gives less good results than a content of 5%.

Example XVII

75 Parts by weight of a polyamide-6 with a reduced viscosity of 125 ml/g (measured by dissolving 0.5 g in 100 ml formic acid of 90% and measuring at 25° C.) were precompounded in an extruder with 25 parts by weight of a maleic anhydride functionalized EPM (maleic anhydride concentration 0.5%; ethylene content: 65%; Mooney viscosity at 127° C.: 30 ML) and 0.5 parts stabilizers. Precompounding conditions were as follows; average temperature settings 275° C., screw speed: 300 r.p.m.

60 Parts by weight of the so-obtained precompound were compounded in an extruder with 36 parts by weight of a functionalized polyphenylene ether, 4 parts by weight of partially hydrogenated styreen-polybutadieen-styreen triblokcopolymer, 0.5 parts by weight stabilisers and 0.5 parts by weight TiO$_2$. As a functionalized polyphenylene a product obtained by reacting a polyphenylene ether with trimellitic anhydride acid chloride was used. The preparation method as described in the first method of example 1 of WO 86/02086 was followed. The intrinsic viscosity of the resulting product was 57.5 ml/g (25° C., measured in chloroform). Compounding conditions: average temperature settings: 285° C., screw speed 300 r.p.m.

The properties of test pieces moulded out of the obtained blend were determined. The results are given in table 7 here below.

TABLE 7

| Properties | Blend according to example XVII |
| --- | --- |
| Tensile strength upon flow (MPa) | 43 |
| Elongation at fracture (%) | 75 |
| Izod impact strength (J/m) | 606 |
| Falling dart impact (J) | 114 |

We claim:
1. An improved polyphenylene ether-polyamide composition comprising, based on 100 parts by weight of combination of (A) and (C):
   (A) (i) 5 to 93 percent by weight of a polyphenylene ether component; and
   (A) (ii) 5 to 93 percent by weight of a polyamide component;
   (B) a compatibilizing agent in an amount sufficient to effect compatibilization between (A) (i) and (A) (ii), and
   (C) at least two different agents to improve the impact strength of the composition, wherein the improvement comprises employing at least one agent suitable to improve the impact strength of component (A) (i); and less than 12.5% by weight of at least one agent to improve the impact strength of component (A) (ii), which is comprised of an alkylene-alkyl(meth)-acrylate copolymer having an alkylene group having 2-6 carbon atoms and an alkyl group having 1-8 carbon atoms.
2. The composition of claim 1 wherein the polyphenylene ether is a homopolymer or a copolymer having units with the repeating structural formula:

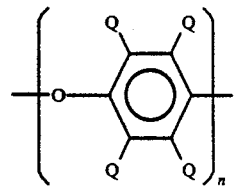

wherein the oxygen ether atom of one unit is connected to the benzene nucleus of the next adjoining unit, and n is a positive integer and is at least 50, and each Q is independently a monovalent substituent selected from a group consisting of hydrogen, halogen, hyrocarbon and hydrocarbonoxy groups free of a tertiary alpha-carbon atom and halohydrocarbon and halohydroxcarbonoxy groups free of a tertiary alpha-carbon atom and having at least 2 carbon atoms between the halogen atom and the phenyl nucleus.
3. The composition of claim 2 wherein the polyphenylene ether is selected from:
poly(2,3-dimethyl-6-ethylphenylene-1,4-ether)
poly(2,3,6-trimethylphenylene-1,4-ether)
poly(2-(4'-methylphenyl)phenylene-1,4-ether)
poly(2-bromo-6-phenylphenylene-1,4-ether)
poly(2-methyl-6-phenylphenylene-1,4-ether)
poly(2-phenylphenylene-1,4-ether)
poly(2-chlorophenylene-1,4-ether)
poly(2-methylphenylene-1,4-ether)
poly(2-chloro-6-ethylphenylene-1,4-ether)
poly(2-chloro-6-bromophenylene-1,4-ether)
poly(2,6-di-n-propyphenylene-1,4-ether)
poly(2-methyl-6-isopropylphenylene-1,4-ether)
poly(2-chloro-6-methylphenylene-1,4-ether)
poly(2-methyl-6-ethylphenylene-1,4-ether)
poly(2,6-dibromophenylene-1,4-ether)
poly(2,6-dichlorophenylenek-1,4-ether)
poly(2,6-diethylphenylene-1,4-ether)
poly(2,6-dimethylphenylene-1,4-ether).
4. The composition of claim 3 wherein the polyphenylene ether is poly(2,6-dimethyl-1,4-phenylene) ether.
5. The composition of claim 1 wherein the agent suitable to improve the impact strength of the polyamide also contains a functional group selected from carboxylic acid, acid anhydride groups, acid amide groups, imido groups, carboxylic acid ester groups, amino groups, hydroxyl groups, or epoxy groups.
6. The composition of claim 5 wherein the agent suitable to improve the impact strength of the polaymide is an ethylene-ethylacrylate-maleic acid polymer or an ethylene-ethylacrylate-fumaric acid polymer.
7. The composition of claim 1 wherein the agent to improve the impact strength of the polyphenylene ether is comprised of a non-hydrogenated vinyl aromatic polydiene di- or triblock copolymer.
8. The composition of claim 1 wherein the agent to improve the impact strength of the polyphenylene ether is comprised of a partially hydrogenated vinyl aromatic diene di- or triblock copolymer.
9. The composition of claim 1 wherein the agent to improve the impact strength of the polyphenylene ether is comprised of polybutadiene.
10. A method of improving the impact strength of a compatibilized polymer mixture comprising a polyphenylene ether and a polyamide comprising:
   (a) mixing in a melt
     (i) at least one polyphenylene ether, (ii) at least one polyamide, (iii) at least one compatibilizing agent, and (iv) at least two agents to improve the impact strength of the compatibilized mixture, the improvement comprising using at least one agent suitable to improve the impact resistance of (a)(i) and less than 12.5% by weight of at least one agent suitable to improve the impact strength of (a) (ii) comprised of an alkylene-alkyl(meth)-acrylate copolymer having an alkylene group having 2-6 carbon atoms and an alkyl group having 1-8 carbon atoms.

11. The method of improving the impact strength of a compatibilized polymer which as claimed in claim 10, wherein component (a) (i), or part of component (a) (i) to be used in first pre-mixed with at least one of the compatibilizing agents (a) (iii) after which the resulting pre-mixture is mixed with the remaining constituents.

12. The method of improving the impact strength of a compatibilized mixture as claimed in claim 11 wherein the pre-mixture formed with components (a) (i), or a part of component (a) (i) to be used, and at least one of components (a) (iii) is also premixed with at least one agent (a) (iv) to improve the impact strength of component (a) (i).

13. The method of improving the impact strength of a compatibilized polymer mixture as claimed in claim 10 wherein component (a) (ii), or a part of component (a) (ii) to be used, is first pre-mixed with at least one of the agents (a) (iv) suitable to improve the impact strength of component (a) (ii), after which the resulting pre-mixture is mixed with the remaining constituents.

14. The method of improving the impact strength of a compatibilized polymer mixture as claimed in claim 10, wherein component (a) (ii), or a part of component (a) (ii) to be used, is first mixed in the melt with at least one of the agents (a) (iv) suitable to improve the impact strength of component (a) (ii), component (a) (i), or a part of component (a) (i) to be used, is mixed in the melt with at least one of the agents (a) (iv) suitable to improve the impact strength of component (a) (i) and with at least one of the agents to improve compatibility of (a) (iii), after which the two resulting pre-mixtures and any remaining components not yet incorporated in the pre-mixtures, are mixed together in the melt.

15. The composition of claim 1 wherein the at least one agent to improve the impact strength of component (A) (ii) is not particularly suitable to improve the impact strength of component (A) (i).

16. The method of improving the impact strength of a compatibilized polymer mixture as claimed in claim 10 wherein the at least one agent suitable to improve the impact strength of component (a) (ii) is not particularly suitable to improve the impact strength of component (a) (i).

17. The composition of claim 1 wherein the alkylene group is selected from the group consisting of ethylene and propylene.

18. The composition of claim 1 wherein the alkyl (meth)-acrylate group is selected from the group consisting of methyl acrylate, ethyl acrylate, hexyl acrylate, methyl methacrylate, ethyl methacrylate, hexyl methacrylate and mixtures thereof.

19. The composition of claim 18 wherein the acrylate content or methacrylate content of the copolymer is from about 10 to about 30% by weight.

20. The composition of claim 1 wherein the olefin content of the copolymer is from about 70 to about 90% by weight.

21. The composition of claim 1 wherein the agent to improve the impact strength is an ethylene-ethylacrylate copolymer.

22. The composition of claim 21 wherein the weight ratio of ethylene to ethylacrylate is about 4.5:1.

* * * * *